(No Model.)
D. D. CURTIS.
BEDSTEAD JOINT.
No. 572,412. Patented Dec. 1, 1896.
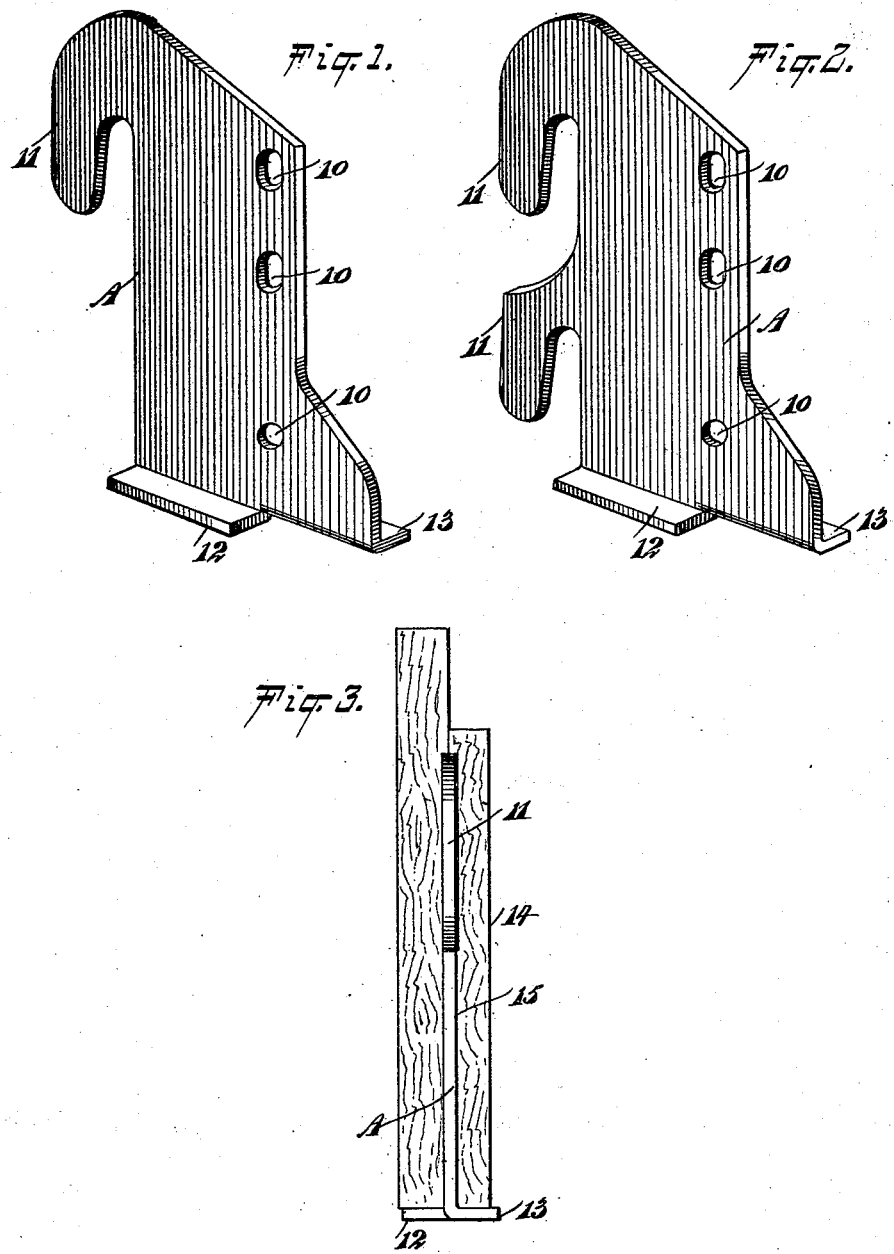

UNITED STATES PATENT OFFICE.

DANIEL D. CURTIS, OF SIDNEY CENTRE, NEW YORK.

BEDSTEAD-JOINT.

SPECIFICATION forming part of Letters Patent No. 572,412, dated December 1, 1896.

Application filed March 3, 1896. Serial No. 581,637. (No model.)

*To all whom it may concern:*

Be it known that I, DANIEL D. CURTIS, of Sidney Centre, in the county of Delaware and State of New York, have invented a new and Improved Bedstead-Joint, of which the following is a full, clear, and exact description.

My invention relates to bedstead-joints, and especially to a bed-rail fastener; and the object of the invention is to provide a fastener for a bed-rail which may be more securely fastened thereto than heretofore, and which will be preserved against vertical motion as well as lateral motion, and which will also serve as a better support for the bed-rail, taking the weight of the rail from the screws or other fastening devices employed to attach the body of the fastener to the rail.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a perspective view of the improved bed-rail fastener, illustrating it as provided with a single hook. Fig. 2 is a similar view, in which, however, the fastener is shown as being provided with two hooks; and Fig. 3 is an end view of a bed-rail, illustrating the fastener in position therein.

In carrying out the invention the body portion A of the bed-rail fastener is constructed, preferably, of metal of suitable thickness, and the said body is provided near its rear edge with any desired number of openings or apertures 10, and the forward edge of the body has formed thereon and ordinarily integral therewith any suitable number of hooks 11, adapted to enter sockets in the head and foot boards of the bed.

The main feature of this invention consists in the formation of the bottom of the body of the fastener, the said lower edge of the body being provided with two or more flanges 12 and 13, the flanges being horizontal or at an angle to the sides of the body, and the said flanges are alternately arranged, one flange being upon the right-hand side of the body and the other flange on the left-hand side, and preferably the forward end of one flange is practically opposite the rear end of the next flange. The flanges are preferably integral with the body, being struck up therefrom.

In the application of the fastener to a bed-rail 14, as shown in Fig. 3, the body is placed in the ordinary vertical slot 15 made in the end portion of the rail and is held in position by passing bolts or their equivalents through the sides of the rail and through the openings or apertures 10 in the fastener; but the flanges 12 and 13 have bearing against the bottom or under edge of the bed-rail, as shown in Fig. 3, so that when the bed-rail is attached to the head-board and to the foot-board the weight which the rail must sustain is not brought to bear on the bolts passed through the fastener, but such weight is mainly sustained by the flanges 12 and 13. Under this construction of the bed-rail fastener it is obvious that the fastener when placed in position in the rail will not be so liable to become loosened as when the fastener is made in the usual manner.

Having thus described my invention, I claim as new and desire to secure by Letters Patent—

1. A bed-rail fastener having flanges formed at its bottom portion, the flanges being upon both sides, one flange in advance of the other, as and for the purpose specified.

2. A bed-rail fastener, the body portion of which is provided with horizontal flanges at its sides, the flanges being in staggered arrangement, whereby the material from which the body is made may be cut and struck up in opposite directions in the formation of the said flanges, as and for the purpose set forth.

DANIEL D. CURTIS.

Witnesses:
GEORGE A. FLINT,
SMITH L. BENNETT.